United States Patent
Tuna et al.

(10) Patent No.: US 9,386,289 B2
(45) Date of Patent: Jul. 5, 2016

(54) AUTOMATIC WHITE BALANCING WITH CHROMATICITY MEASURE OF RAW IMAGE DATA

(71) Applicant: Intel Corporation, Santa Clara, CA (US)

(72) Inventors: Uygar Tuna, Kangasala (FI); Jarno Nikkanen, Kangasala (FI); Vladislav Uzunov, Tampere (FI)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 14/264,772

(22) Filed: Apr. 29, 2014

(65) Prior Publication Data

US 2015/0312540 A1 Oct. 29, 2015

(51) Int. Cl.
*H04N 9/73* (2006.01)
*H04N 9/64* (2006.01)
*G06T 7/40* (2006.01)

(52) U.S. Cl.
CPC ............. *H04N 9/735* (2013.01); *G06T 7/408* (2013.01); *H04N 9/646* (2013.01); *G06T 2207/10024* (2013.01); *G06T 2207/20076* (2013.01)

(58) Field of Classification Search
CPC ........ H04N 9/735; H04N 9/646; G06T 7/408; G06T 2207/20076; G06T 2207/10024
See application file for complete search history.

(56) References Cited

U.S. PATENT DOCUMENTS

| | | | | |
|---|---|---|---|---|
| 8,520,919 B2* | 8/2013 | Stepp | ................... | A61B 1/0638 250/350 |
| 8,599,280 B2* | 12/2013 | Lipowezky | ............ | H04N 9/735 348/223.1 |
| 2008/0088857 A1* | 4/2008 | Zimmer | ................... | H04N 1/56 358/1.6 |
| 2008/0143844 A1* | 6/2008 | Innocent | ................ | H04N 9/735 348/223.1 |
| 2008/0294017 A1 | 11/2008 | Gobeyn et al. | | |

(Continued)

OTHER PUBLICATIONS

G. Buchsbaum, "A spatial processor model for object colour perception", Journal of the Franklin Institute, vol. 310, No. 1, 1980, pp. 1-26. (1 page of Abstract only).

(Continued)

*Primary Examiner* — Aung S Moe
(74) *Attorney, Agent, or Firm* — Green, Howard & Mughal LLP

(57) ABSTRACT

An apparatus and methods for estimating a chromaticity of illumination from raw image data. In an embodiment, one or more image chromaticity weight is determined based on a distance between the raw image data in a sensor chromaticity space and a nearest point within a locus of sensor illumination chromaticities. In a further embodiment, one or more image chromaticity weight is determined based on a disparity among normalized color channel values. In certain embodiments, image chromaticity estimates are utilized to determine a white point estimate for the raw image data. In embodiments, an electronic device including a camera estimates the chromaticity value of raw image data captured by the camera as part of an AWB pipeline. The electronic device may further determine, for example as part of the AWB pipeline, a white point estimate based, at least in part, on the raw image data chromaticity value estimate(s).

23 Claims, 7 Drawing Sheets

(56) References Cited

U.S. PATENT DOCUMENTS

| | | | |
|---|---|---|---|
| 2010/0149403 A1* | 6/2010 | Wang | H04N 5/2258 348/335 |
| 2011/0096190 A1* | 4/2011 | Silverstein | H04N 9/735 348/223.1 |
| 2011/0285738 A1* | 11/2011 | Hsieh | G09G 5/02 345/589 |
| 2012/0050563 A1 | 3/2012 | Cote et al. | |
| 2012/0147213 A1 | 6/2012 | Dalton | |
| 2013/0222652 A1* | 8/2013 | Akeley | H04N 9/045 348/241 |
| 2013/0321679 A1 | 12/2013 | Lim et al. | |

OTHER PUBLICATIONS

Finlayson, et al., "Color by correlation: A simple, unifying framework for color constancy", IEEE transactions on pattern analysis and machine intelligence, vol. 23, No. 11, Nov. 2001, pp. 1209-1221.

Forsyth, D. A., "A novel algorithm for color constancy", International Journal of Computer Vision, vol. 5, No. 1, 1990, 7 pages.

Lam, et al., "Automatic white balancing using adjacent channels adjustment in RGB domain", In Multimedia and Expo, ICME'04. 2004 IEEE International Conference on IEEE, vol. 2, Jun. 2004, pp. 979-982.

Jarno T. Nikkanen, "Color constancy by characterization of illumination chromaticity", Optical Engineering, vol. 50 (5), 057204, May 2011, 15 Pages.

Rahtu, et al., "Applying Visual Object Categorization and Memory Colors for Automatic Color Constancy", Nokia Corporation, ICIAP09, 2009, 10 Pages.

Rezagholizadeh, et al., "Edge-based and Efficient Chromaticity Spatio-Spectral Models for Color Constancy", International Conference on Computer and Robot Vision, 2013, pp. 188-195.

Van De Weijer, et al., "Edge-based color constancy" IEEE Transactions on Image Processing, vol. 16, No. 9, Sep. 2007, pp. 2207-2214.

International Search Report and Written Opinion mailed Jun. 18, 2015, for PCT Application No. PCT/US2015/020370.

* cited by examiner

AUTOMATIC WHITE BALANCING WITH CHROMATICITY MEASURE OF RAW IMAGE DATA

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc. The transformation of image data collected by a camera module (e.g., camera sensor and optics) into values suitable for reproduction and/or display poses a challenging problem for camera control algorithms (CCA) implemented by device platforms. A computational color constancy algorithm, also known as an automatic white-balancing (AWB) algorithm, is one important part of a CCA for achieving desired color reproduction from digital cameras. The role of AWB is to estimate the chromaticity of illumination (or chromaticities in case of multiple different light sources) in terms of the response of the camera sensor color components. AWB typically entails adjustment of the intensities of the different color components to enable color reproduction that a user expects, in which the needed adjustment is highly dependent on image sensor characteristics and ambient illumination conditions at the time of capture.

Knowledge of raw image data chromaticity is advantageous for estimating the white point reliably and accurately. One technique known as the gray-edge algorithm is premised on reflections originating from the edges in a raw image data most likely being achromatic. Achromatic regions are therefore obtained from around edges within a scene. In practice, the gray-edge algorithm may require high-resolution information to be available for accurate edge information extraction, and so the accuracy of the gray-edge algorithm may be degraded significantly by a down-sampled representation (i.e. low resolution) of the raw image. Therefore, the gray-edge algorithm may not be well suited to some device platforms having limited processing capability, or operating under tight power constraints, such as most mobile device platforms. Also, the gray-edge technique does not address scenes lacking edges or matte edges and surfaces. Other conventional methods, for example employing gamut mapping, or color by correlation techniques often rely heavily on camera module characterization (CMC) information, leading them to be susceptible to CMC information errors associated with mass-production of the camera modules. CMC-intensive methods may also be computationally expensive.

Techniques for accurately estimating illumination chromaticity in terms of raw image data without strong assumptions of image content, with minimal reliance on CMC data, and without high-level image processing would therefore be advantageous, for example to improve an AWB algorithm and thereby enhance performance of digital camera platforms.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
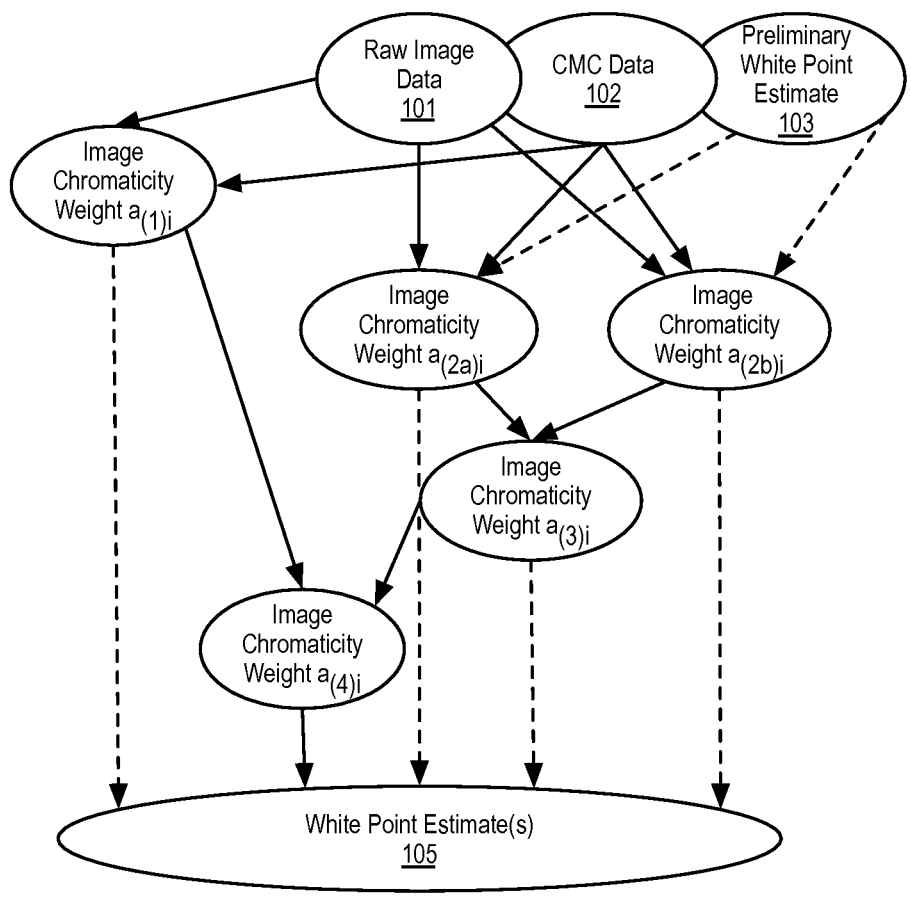
FIG. 1 is a graph illustrating a plurality of image chromaticity weights, each of which may be determined and input into an AWB algorithm, in accordance with one or more embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for estimating the chromaticity value of raw image data. In certain embodiments, the image chromaticity estimate is utilized to determine a white point estimate for the raw image data. In further embodiments, the white point estimate may be combined with one or more additional white point estimate determined for the raw image data through other algorithms, such as a CMC-dependent techniques. In embodiments, an electronic device including a camera estimates the chromaticity of raw image data captured by the camera as part of an AWB pipeline. The electronic device may further determine, for example as part of the AWB pipeline, a white point estimate based, at least in part, on the raw image data chromaticity value estimate.

As described in further detail below, raw image data chromaticity measurements may entail determining a distance of raw image data to a reference position of an illumination chromaticity probability map. A chromaticity of the raw image data may then be determined based on this distance, for example with image data being deemed more achromatic with decreasing distance to a center of the white map. For such embodiments it may be assumed that within the chromaticity space, relatively more achromatic image data is located in the high-probability region(s) of a map of illumination chromaticities, while the relatively more chromatic image data falls into regions farther from the high probability region.

As also described in more detail below, raw image data chromaticity measurement embodiments may entail comparing R, G, and B color channel energy levels. Image data with convergent channel energies may be assessed as more achromatic than image data having more divergent color channel energies. In certain such embodiments, chromaticity is determined based upon on the disparity between R, G and B channel values normalized by a white point correction factor that is dependent on camera module characterization (CMC) information and/or a previously determined "preliminary" white point estimate.

Also as described below, image data determined to be achromatic by one or more of the above techniques may be utilized by an AWB method in preference over chromatic image data to determine a chromaticity of illumination. "Chromaticity of illumination" is a chromaticity value that is determined from a block of pixels of different color components (e.g., R, G, and B color components) registering light reflected from an achromatic surface (reflecting all wavelengths equally without altering the illumination spectrum, and hence directly indicating the illumination chromaticity). Based on this "chromaticity of illumination" the R, G and B gains to be applied in the ISP image reconstruction are calculated by the AWB algorithm/pipeline. Chromaticity of illumination is distinguished from the true chromaticity of objects (i.e. color of objects). More specifically, the correct reproduction of object color follows from: (i) an AWB algorithm being able to correctly estimate the chromaticity of illumination; followed by (ii) accurate color conversion from sensor RGB to sRGB. Embodiments may achieve more accurate and robust white point estimates without burdensome image resolution and/or image content requirements, and also without computationally intensive image processing (e.g., edge detection).

Chromaticity measurement embodiments described herein are independent of how an input image is represented. For example, the chromaticity measurements described herein may be applied at full image resolution, or raw image area may be divided into a "grid" of blocks having either fixed, equal size or variable size. Each block covers the area of multiple pixels of different color components (e.g. R, G and B color components). The average level of each color component in the area of the block can be calculated (e.g., denoting averages as $R_i$, $G_i$, and $B_i$ for block i). The chromaticity value at block i is then equal to $[R_i/G_i, B_i/G_i]$.

As used herein, "raw" image data is image data that may be pre-processed by an upstream image signal processing (ISP) pipeline. For example, in one embodiment raw image data has been linearized and color shade corrected. More specifically, raw Bayer data, or the like, output by camera sensor may undergo linearization (including also black level correction) and color shading correction before the raw image data chromaticity is calculated following one or more of the embodiments described herein.

FIG. 1 is a graph illustrating a plurality of image chromaticity weights, each of which may be determined and input into an AWB algorithm, in accordance with embodiments. Solid arrows in FIG. 1 illustrate one exemplary embodiment described in detail herein. Dashed arrows illustrate one or more alternative embodiments that may also be practiced to good effect based on the principles taught in the context of the exemplary embodiment.

A "chromaticity weight" is a measure of raw image data chromaticity, for example scaling between 0 and 1 with a larger weight value being associated with a more achromatic raw image than a lower weight value. Raw image data that is more achromatic more accurately reflects the illumination chromaticity, and so AWB white balancing gains may be advantageously calculated based on raw image data deemed sufficiently achromatic by the algorithms described herein. As illustrated in FIG. 1, a plurality of image chromaticity weights (e.g., $a_{(1)i}$, $a_{(2a)i}$, $a_{(2b)i}$) may be determined for a raw data block i having multiple pixels of different color components. The chromaticity weights may be determined independently (e.g., in parallel) using distinct measurement algorithms to arrive at independent measures of chromaticity for raw image data 101. Image chromaticity weights are advantageously determined following algorithms that render the weights complementary so that together the weights represent a robust illumination chromaticity measurement of the raw image data. Alternatively, one or more of the chromaticity weights may be utilized in absence of other weights, for example as a function of some control signal, etc.

Following the data dependency arrows in FIG. 1, chromaticity weight $a_{(1)i}$ may be determined by processing raw image data through a first algorithm. As further illustrated in FIG. 1, chromaticity weight $a_{(1)i}$ may then be employed in a white point estimate 105. Chromaticity weight $a_{(1)i}$ may be so employed exclusive of any other chromaticity weight, or in a manner inclusive of chromaticity weight $a_{(2a)i}$ and/or $a_{(2b)i}$. For example, following the solid arrows, three chromaticity measurement algorithms may be independently performed on raw image data 101, generating chromaticity weights $a_{(1)i}$, $a_{(2a)i}$ and $a_{(2b)i}$, which are subsequently combined, linearly or non-linearly, to form derivative chromaticity weights $a_{3i}$, $a_{(4i)}$ as inputs to white point estimate 105. Exemplary combinations of chromaticity weights include, but are not limited to, products of two or more weights, an average of two or more weights, a weighted averages of two or more weights, a maximum of two or more weights, a minimum of two or more weights, a median or two or more weights, or a non-linear combination such as $(a_1^m + \ldots a_k^m)^{1/n}$.

As illustrated in FIG. 1, one or more of the plurality of image chromaticity weights (e.g., $a_{(1)i}$, $a_{(2a)i}$, $a_{(2b)i}$) may be further based, in part, on CMC characterization data 102. For embodiments where the chromaticity measures generating weights $a_{(1)i}$, $a_{(2a)i}$, $a_{(2b)i}$ are at a front end of an AWB pipeline, it is advantageous to enlist CMC data in a limited manner so that the chromaticity weights are insensitive to inaccuracies in the CMC data. In further embodiments, a preliminary white point estimate 103 is utilized as an input to determine one or more of image chromaticity weights $a_{(1)i}$, $a_{(2a)i}$, $a_{(2b)i}$. As described further below, the preliminary white point estimate 103 may be determined with still another algorithm distinct from those described elsewhere herein for determining the chromaticity weights $a_{(1)i}$, $a_{(2a)i}$, $a_{(2b)i}$. Thus, the chromaticity measurement embodiments described herein are not limited to being a first stage in an AWB algorithm. Serially staging multiple chromaticity measurements may be an advantageous manner of combining the measurements for increase robustness to image scene content variation. Although not depicted in FIG. 1, one or more of the chromaticity weights $a_{(1)i}$, $a_{(2a)i}$, $a_{(2b)i}$ may themselves be serially staged, with one measurement algorithm outputting a chromaticity weight (e.g., $a_{(1)i}$) that is utilized in some manner to determine another chromaticity weight (e.g. $a_{(2a)i}$ and/or $a_{(2b)i}$) through a second measurement algorithm. For example, the preliminary white point estimate 103 may be based on chromaticity weight $a_{(1)i}$ and that preliminary white point estimate may then be employed to further determine the chromaticity weights $a_{(2a)i}$, $a_{(2b)i}$. Thus, the chromaticity measurement embodiments described herein may be utilized across multiple stages of an AWB algorithm.

Figure 2:
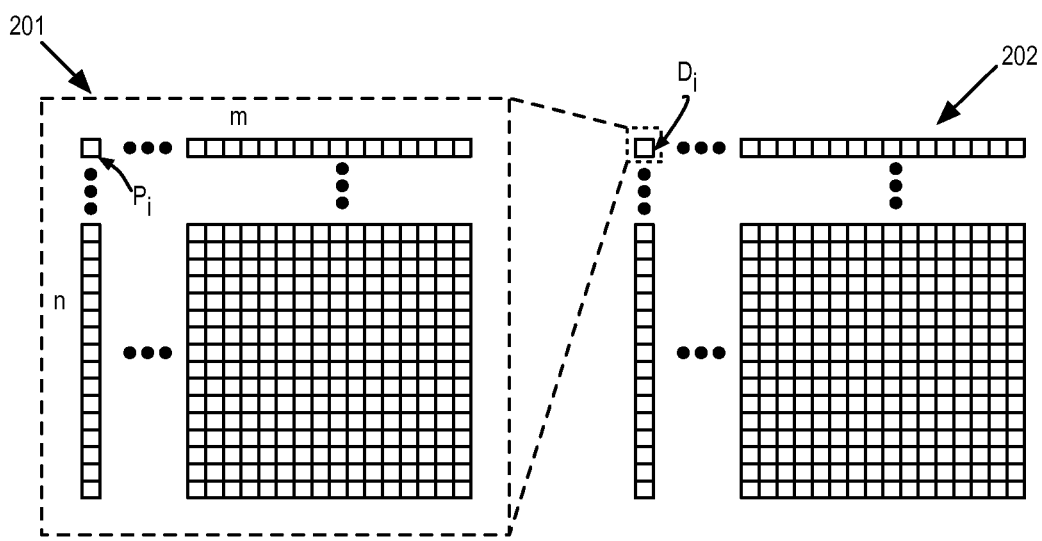
FIG. 2 is an illustration of raw image pixel data associated with a raw image data block, in accordance with one or more embodiment.

FIG. 2 is an illustration of an expanded view of raw image pixel data 201 associated with a raw image data block $D_i$, in accordance with one exemplary embodiment. As illustrated, N raw image data blocks $D_i$ form an image grid 202 having width and height of equally sized and evenly distributed blocks $D_i$. The image grid 202 is a lower resolution representation of an array of raw image pixel data 201 collected for pixels $P_i$ of a camera module. Each data block $D_i$ provides a representation of m×n pixels. For example, data block $D_i$ may include color channel values (e.g., R, G, B) that are each averaged over the m×n pixels. The raw image grid 202 may include any number of raw image data blocks as a function of the native resolution of a camera module, depending processor bandwidth available to perform a chromaticity measure, and depending on whether a set of m×n pixels are specific to one block, or are merged into multiple, different blocks. The number of raw image data blocks may be increased for higher camera resolutions and/or greater sensitivity to small achromatic regions at the expense of computation and noise. As one example, raw image grid 202 includes an 80×60 array of blocks (i.e., N=4800).

Figure 3A:
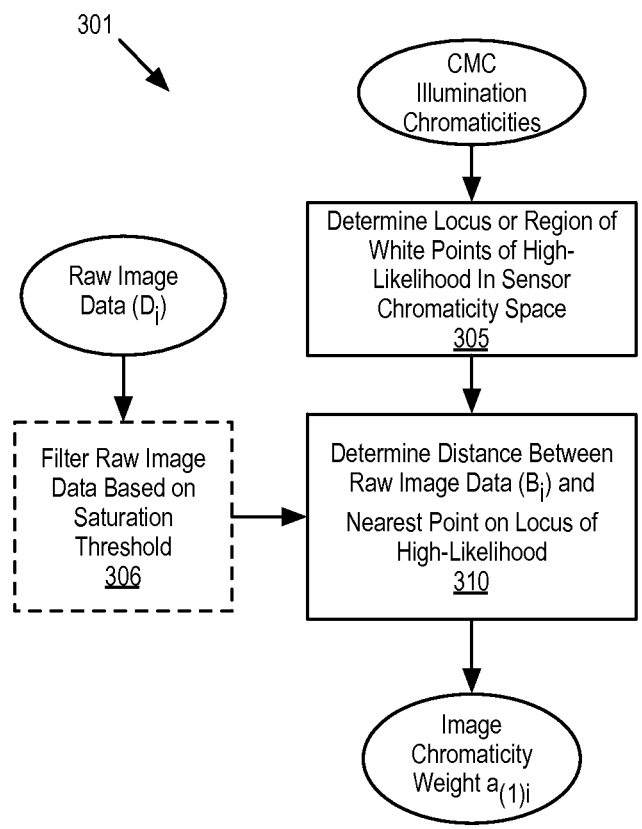
FIG. 3A is a flow diagram illustrating a method for determining one or more chromaticity weight, in accordance with one or more embodiment.
Figure 3B:
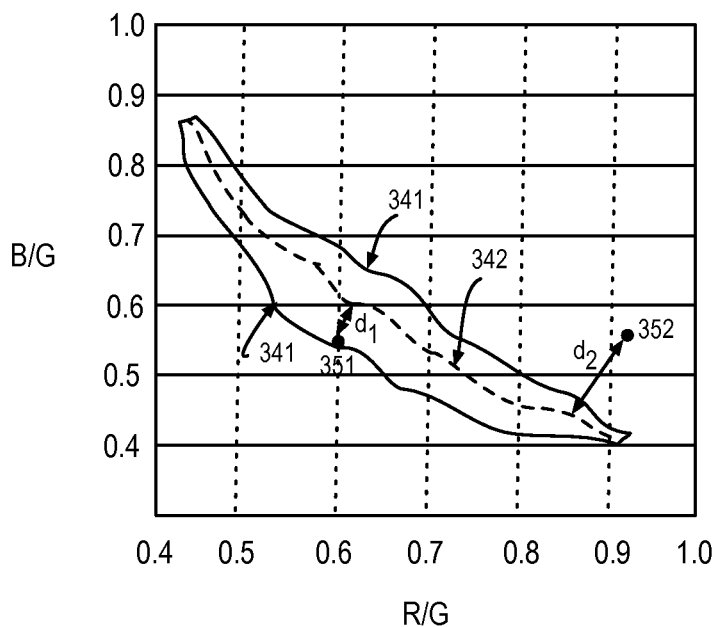
FIG. 3B is a graph of chromatic and achromatic raw image data plotted in [R/G, B/G] sensor chromaticity space, in accordance with one or more embodiment.

In an embodiment, one or more image chromaticity weight is determined based on a distance between the location of the raw image data in the sensor chromaticity space and a nearest point within, and/or around a locus or region of sensor illumination chromaticities. FIG. 3A is a flow diagram illustrating a method 301 for determining one or more chromaticity weight $a_{(1)i}$ for a raw image data block $D_i$, in accordance with one such embodiment. Method 301 begins with receiving or accessing CMC data associated with an image sensor employed to collect image pixel data represented by the raw image data block $D_i$ to be analyzed. The CMC data may advantageously include for example, spectral responses of the RGB color components of the camera module, and knowledge of illumination chromaticities and typical illumination spectra for the chromaticity points at different correlated color temperature (CCT) regions. At operation 305, a locus of white points of high-likelihood within the sensor chromaticity space are determined from the CMC data. Alternatively, a region of chromaticity space associated with a predetermined confidence level is determined at operation 305. In one exemplary embodiment, the locus of white points is an average illumination chromaticity along with the related CCT values determined by mapping illumination chromaticities in [R/G, B/G] sensor space. Such a two-dimensional "white map" is illustrated in FIG. 3B with the locus of average illumination chromaticity 342 demarked within a high-likelihood white point map 341 (e.g., determined as a function of the illumination chromaticity response deviation from the locus of average illumination chromaticity 342).

Method 301 continues at operation 306 where raw data block $D_i$ may be optionally filtered based on a predetermined saturation value threshold. In one exemplary embodiment where the average level of non-saturated red, green, and blue pixels is stored for each raw image data block $D_i$, the amount of saturated pixels within that block in relation to the total amount of pixels in the block is also stored. A raw image data block $D_i$ having too many saturated pixels is omitted from method 301 because true chromaticity information is lost for the saturated pixels. In addition, pixels close to saturated pixels could be affected by pixel blooming, depending on the characteristics of the sensor. Hence, method 301 may proceed to subsequent operations only for raw image data blocks associated with a saturation value below a predetermined maximum saturation threshold.

The probability that measured raw image data is more achromatic increases with decreasing distance between raw image data and the locus of white point of high-likelihood in the sensor chromaticity space. This distance is therefore quantified for each raw data block $D_i$ at operation 310 and may be calculated in various ways. FIG. 3B further illustrates two raw image data values 351, 352 mapped to the sensor chromaticity space. Following embodiments herein, raw image data value 351 is deemed more achromatic than raw image data value 352 because raw image data value 351 is closer to the locus of average illumination chromaticity 342 (distance $d_1$) than is raw image data value 352 (distance $d_2$). Any distance information may serves as the basis for the measure of chromaticity for a raw image data $D_i$. In certain embodiments, image chromaticity weight am, may be made directly proportional to the distance. For example, an absolute Euclidean distance within sensor chromaticity space may be determined between R/G, B/G values of a raw image data block i and a nearest point within a locus of sensor illumination chromaticities. In one implementation, the locus is the average illumination chromaticity (e.g., locus 342). In alternative embodiments, distance between the raw data and some larger region defined by high-likelihood threshold may be determined. For example, distance can be assumed to be fixed at a predetermined value (e.g., 1) within the white map space 341, and a distance to the borders of the white map space 341 determined if the raw image data falls outside of white map space 341.

Figure 4A:
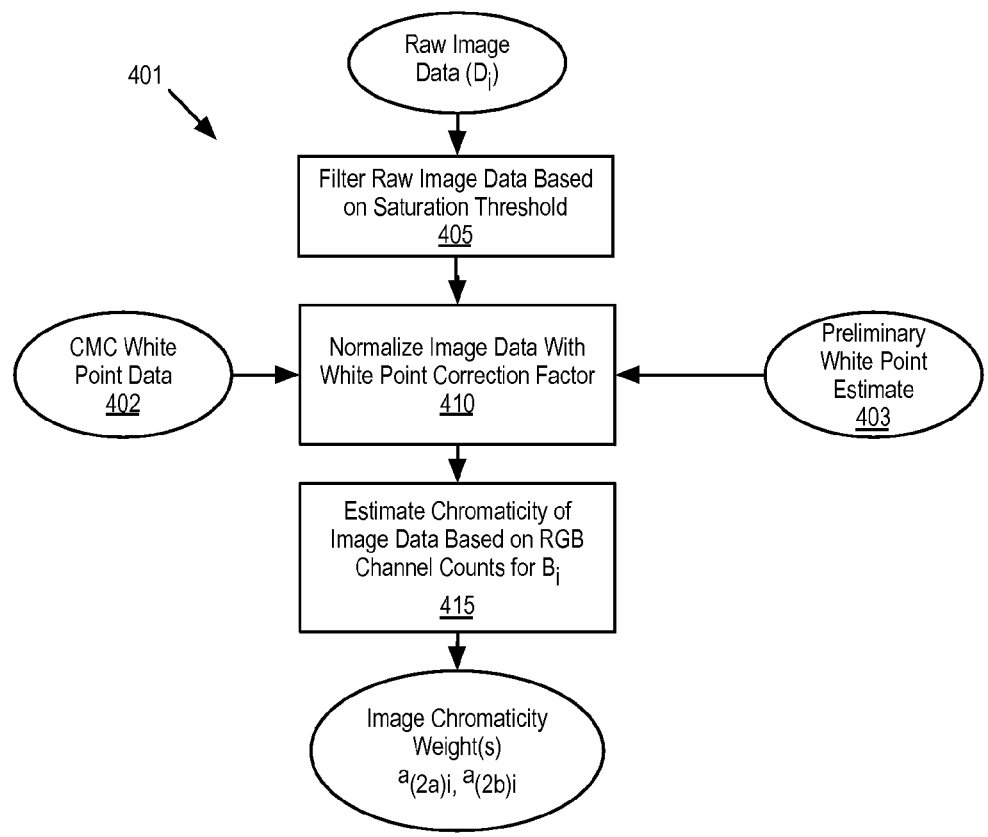
FIG. 4A is a flow diagram illustrating a method for determining one or more chromaticity weight, in accordance with one or more embodiment.

In an embodiment, one or more image chromaticity weight is determined based on a disparity among normalized color channel values. FIG. 4A is a flow diagram illustrating a method 401 for determining one or more chromaticity weights $a_{(2a)i}$, $a_{(2b)i}$, for a raw image data block $D_i$, in accordance with one or more embodiments. Method 401 begins with receiving color channel values associated with a raw image data block $D_i$. In an exemplary embodiment, the color channel values include three (e.g., R,G,B) channel values. At operation 405, raw data block $D_i$ is again filtered based on a color saturation value threshold. In one exemplary embodiment where the average level of non-saturated red, green, and blue pixels is stored for each raw image data block $D_i$, the amount of saturated pixels within that block in relation to the total amount of pixels in the block is also stored. A raw image data block $D_i$ having too many saturated pixels is omitted from method 401. Hence, method 401 may proceed to subsequent operations only for raw image data blocks associated with a saturation value below a predetermined maximum saturation threshold.

Figure 4B:
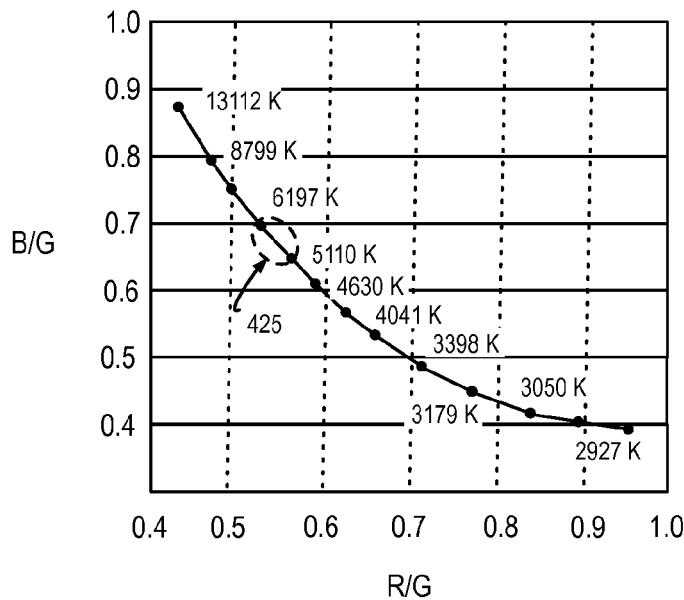
FIG. 4B is a graph of CMC data plotted in [R/G, B/G] sensor chromaticity space, in accordance with one or more embodiment.
Figure 4C:
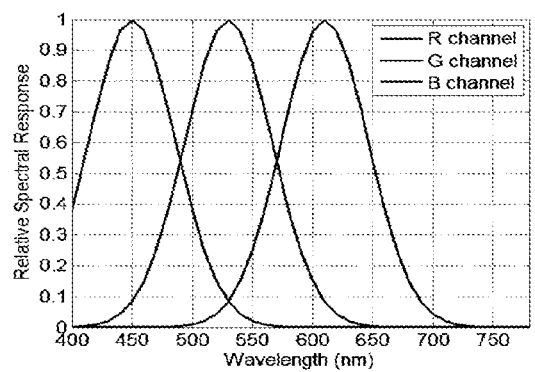
FIG. 4C is a graph of relative spectral response of an exemplary camera sensor, after normalization, in accordance with one or more embodiment.

At operation 410, the color channel values are normalized with a white point correction factor. As illustrated in FIG. 4A, normalization operation 410 may be based on CMC data 402 and/or a preliminary white point estimate 401. In one embodiment, the white point correction factor is a fixed value determined based image sensor characterization data associated with an image sensor employed to collect the image pixel data represented by the raw image data block (i.e., CMC data). As one example, the white point correction factor may be based on CMC data associated with daylight illumination. FIG. 4B is a graph of CMC data plotted in [R/G, B/G] sensor chromaticity space, in accordance with an embodiment. R/G and B/G values associated with a particular illumination white point, such as 5500K, may be determined from the CMC data. Gains to the RBG color channel values of the raw image data block $D_i$ may then be normalized by a correction factor, such as $[1/(R/G)_{5500}, 1, 1/(B/G)_{5500}]$. FIG. 4C is a graph of relative spectral response of RGB color channels for raw image data associated with an exemplary camera sensor after normalization operation 410.

In another embodiment, instead of fixing the normalization point at a predetermined CCT, the normalization point is determined according to a distinct AWB algorithm employed at operation 403 to generate a preliminary white point estimate (e.g., preliminary estimate 103 in FIG. 1). While operation 403 may employ any algorithm to determine the normalization point, the operative principle of the algorithm employed is advantageously different than the principle of method 401. Strong and weak points of each algorithm are advantageously complementary for different types of scenes. The algorithm utilized at operation 403 is then advantageously linked to the output of the chromaticity measurement method 401 through the dependency of the normalization operation 410. As one example, the initial white point estimation (or initial CCT range estimation) operation 403 may be performed using information based on illumination gamuts in the sensor chromaticity space. An estimate for the CCT range and/or white point may be based on which illumination gamut the measured raw image data fall. Gain correction factors employed at operation 410 may then be determined based on color channel values associated with the preliminary white point estimate determined at operation 403.

Following normalization, method 401 continues with operation 415 where the chromaticity of the raw image data block $D_i$ is estimated based on how close the R, G and B channel values are to each other. The closer, or more convergent, the channel counts, the more achromatic the image data block. Notably, illumination spectrums that are far from the illumination spectrum that corresponds to the white point correction factor utilized for normalizing the color channels prior to assessing the channel energy divergence, will induce larger differences between the color components for achromatic objects. However, the same effect can be expected to occur for more chromatic objects. One or more chromaticity weights $a_{(2a)i}$, $a_{(2b)i}$ may be determined as a function of the disparity between normalized color channel values. Any variation metric may be determined at operation 415. In one exemplary embodiment, a minimum color channel value min $(R_i, G_i, B_i)$, and a maximum color channel value max$(R_i, G_i, B_i)$, from the normalized raw image data block $D_i$ are determined at operation 415. Chromaticity weight $a_{(2a)i}$ may then be based on a ratio of the minimum and maximum color channel values:

$$a_{(2a)i} = \frac{\min(R_i, G_i, B_i)}{\max(R_i, G_i, B_i)}. \quad (1)$$

Chromaticity weight $a_{(2a)i}$ is then stored to a memory for each raw image data block $B_i$ for subsequent use in determining a white point for N data blocks (e.g., as part of an AWB method). In a further embodiment, a mean color channel value $Y_i$ is determined at operation 415 for the normalized raw image data block $D_i$. An absolute difference, or an nth power distance, may be further determined. In one exemplary embodiment, a root mean square deviation of the color channel values is determined:

$$Y_i = \text{mean}(R_i, G_i, B_i), \text{ and} \quad (2)$$

$$a_{(2b)i} = 1 - \sqrt{\frac{(R_i - Y_i)^2 + (G_i - Y_i)^2 + (B_i - Y_i)^2}{3k}}, \quad (3)$$

where k is a normalization constant based on the maximum allowable channel value, and consequently number of bits per channel, b. The normalization constant may be calculated as:

$$\frac{1}{2}\left(\frac{2(2^b - 1)}{3}\right)^2 \quad (4)$$

As one example, k is calculated to be 14450 for 8-bit data (i.e. having a maximum channel value of 255). For each of these exemplary embodiments, chromaticity weights $a_{(2a)i}$, $a_{(2b)i}$ are inverse functions of the disparity between the color channel values such that $a_{(2a)i}$, $a_{(2b)i}$ are closer to 1 for achromatic raw image data, and closer to 0 for relatively more chromatic raw image data.

Figure 4D:
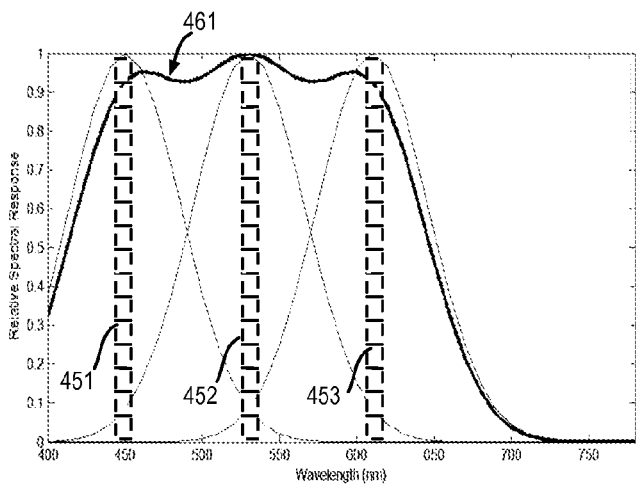
FIG. 4D is a graph of a relative spectral response of raw image data, in accordance with one or more embodiment.

FIG. 4D is a graph of a spectral reflectance 461 of a nearly achromatic object surface (e.g., gray) assuming an equal energy illuminant, in accordance with an embodiment. Spectral reflectance 461 is obtained after summing the RGB channels, which are normalized for illustration purposes. Digital values corresponding to each of a blue normalized channel energy 451, a green normalized channel energy 452, and a red normalized channel energy 453 are almost equal. With such raw image data, chromaticity weights $a_{(2a)i}$, $a_{(2b)i}$ determined through equations (1)-(4) will be close to 1 and the raw image data block $B_i$ deemed relatively more achromatic.

Figure 4E:
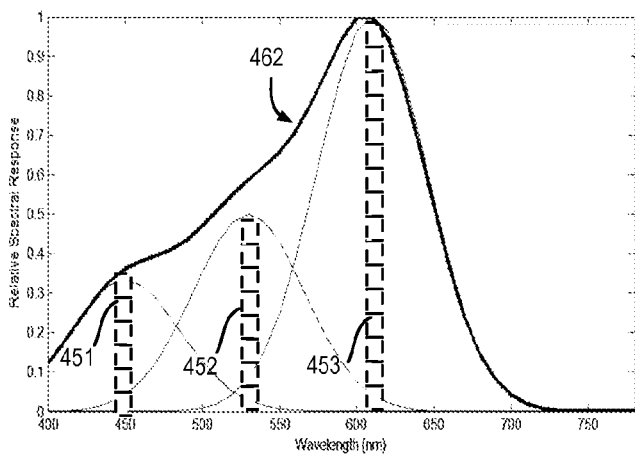
FIG. 4E is a graph of a relative spectral response of raw image data, in accordance with one or more embodiment.

FIG. 4E is a graph of a spectral reflectance 462 of a more chromatic object surface (e.g., brown) assuming an equal energy illuminant, in accordance with an embodiment. With this raw image data, red normalized channel energy 453 is significantly higher than that of blue and green normalized channel energies 451, 452. Chromaticity weights $a_{(2a)i}$, $a_{(2b)i}$ determined through equations (1)-(4) will be far from 1, towards 0, and the raw image data block $B_i$ correspondingly deemed relatively more chromatic.

In an embodiment, a first white point estimate is determined as a function of one or more of the image chromaticity weights. With the individual image chromaticity weights $a_{(1)i}$-$a_{(2b)i}$ determined as described above, the weights may be combined to arrive at one weight for a raw image data block $D_i$. For example, as illustrated in FIG. 1, chromaticity weights $a_{(2a)i}$ and $a_{(2b)i}$ may be combined to derive chromaticity weight $a_{(3)i}$. As noted above in reference to FIG. 1, chromaticity weights may be combined in any linear or non-linear manner. In certain embodiments, statistics such as means, medians, weighted means, etc. may be utilized. In one exemplary embodiment, $a_{(3)i}$ is a product of $a_{(2a)i}$ and $a_{(2b)i}$. In further embodiments, chromaticity weight $a_{(3)i}$ is combined with chromaticity weight $a_{(1)i}$, for example by taking the product of $a_{(2a)i}$, $a_{(2b)i}$, and $a_{(1)i}$, to derive chromaticity weight $a_{(4)i}$.

Figure 5:
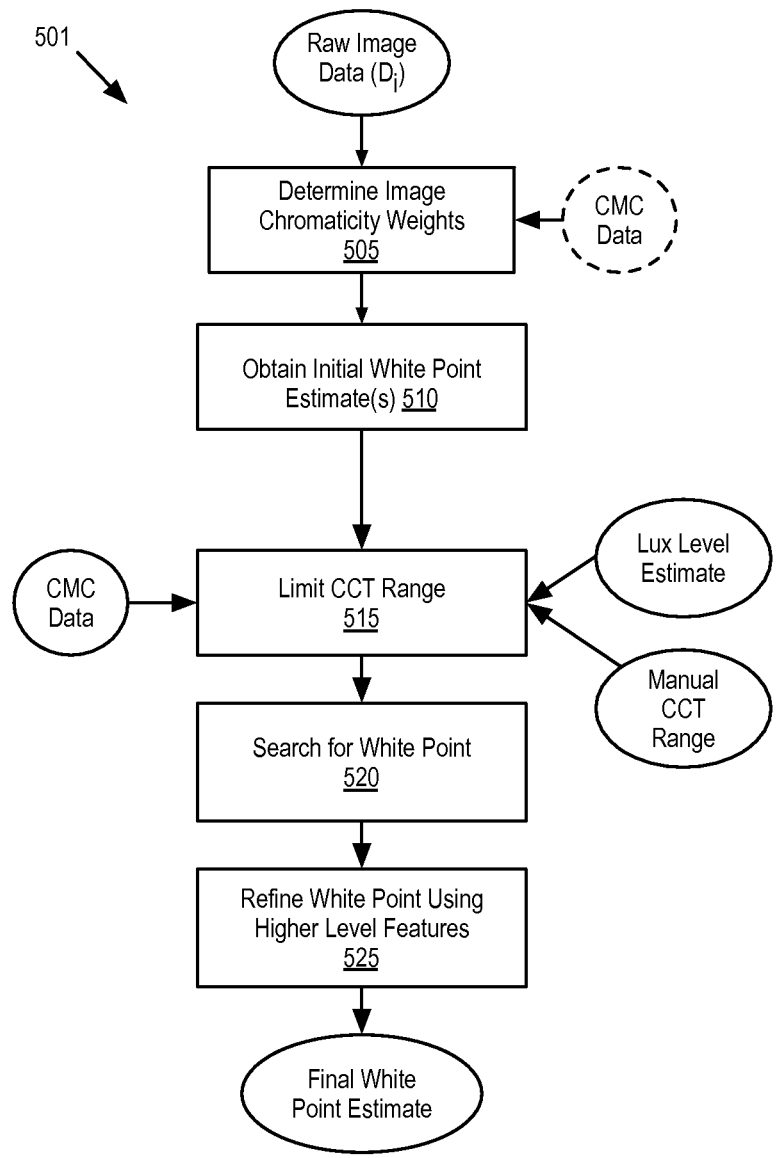
FIG. 5 is a flow diagram illustrating an AWB method for determining at least one white point estimate based a chromaticity weight, in accordance with one or more embodiment.

FIG. 5 is a flow diagram illustrating an AWB method 501 in which at least one white point estimate is determined based on one or more of the chromaticity weights $a_{(1)i}$-$a_{(2b)i}$, in accordance with an embodiment. Method 501 begins at operation 505 where image chromaticity weights $a_{(1)i}$-$a_{(2b)i}$ are determined for each of N raw image data blocks $D_i$, for example by performing any of the methods described above (e.g., method 301, 401, etc.). At operation 510, an initial white point estimate is determined based on one or more camera module independent algorithms, such as the gray-world (GW) algorithm, one-count GW algorithm, or modified max RGB algorithm, etc.

The white point estimation operation 510 is, in part, further based on one or more of the image chromaticity weights $a_{(1)i}$, $a_{(2a)i}$, $a_{(2b)i}$ determined at operation 505. For example, in the GW algorithm where values of the R, G, and B components of the image are averaged to arrive at a common gray value representing the achromatic point in the sensor chromaticity space, the $R_i$, $G_i$, and $B_i$ color channel values associated with a raw image data block $D_i$ are multiplied with an image chromaticity weight and the chromaticity weighted values are then accumulated over the plurality of data blocks:

$$WP_{gw\_chromaticity\_weighted} = \left[\frac{\sum_{i=0}^{N-1} a_i R(i)}{\sum_{i=0}^{N-1} a_i G(i)}, \frac{\sum_{i=0}^{N-1} a_i B(i)}{\sum_{i=0}^{N-1} a_i G(i)}\right]. \quad (5)$$

In equation (5), $a_i$ is any of the chromaticity weights $a_{(i)1}$-$a_{(i)4}$, and in the exemplary embodiment is $a_{(i)4}$ (e.g., the product of $a_{(i)1}$, $a_{(2a)i}$, and $a_{(2b)i}$). In certain embodiments where more than one algorithm is utilized at operation 510, a weighted average of the white points, or white point candidates determined by the various algorithms may output as a white point estimate. This estimate may then be stored to a memory as a result of one stage in an AWB pipeline.

In one embodiment, the AWB pipeline terminates with operation 510. In the exemplary embodiment illustrated by method 501 however, the candidate white points obtained at operation 510 provide an estimate of the CCT range in which the final white point resides. This range estimate is input into one or more additional stage in the AWB pipeline. Depending on the reliability of the white points obtained at operation 510, one or more CMC-data dependent algorithm may be utilized to search a reduced CCT range for the final white point estimate. At operation 515 for example, CCT is further restricted based on camera module characterization data, a lux level estimate, and/or manual CCT range limits. A search for achromatic areas is then performed at operation 520 employing one or more search criteria/algorithm. At operation 525, the white point identified by the search is refined based on higher-level features, such as face, skin, scene information, user data, and geographical or other device information to arrive at the final white point estimate output by method 501. The final white point estimate is then stored to a memory and may be utilized for gain balancing in any conventional manner.

Figure 6:
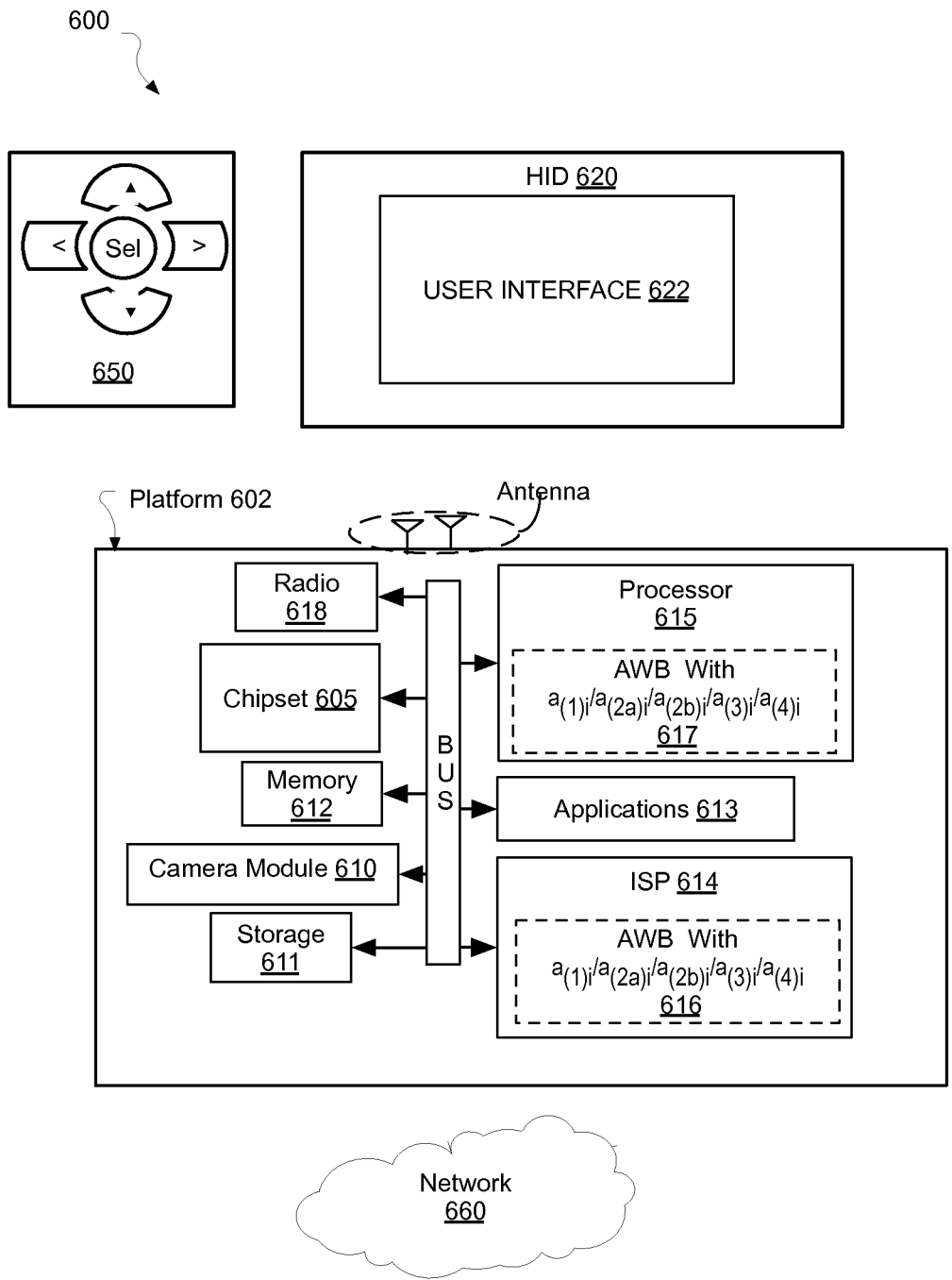
FIG. 6 is a diagram of an exemplary system employing one or more processor including logic to perform an image chromaticity measure, and/or to perform at least one AWB method based on an image chromaticity weight, in accordance with one or more embodiment.

FIG. 6 is an illustrative diagram of an exemplary system 600, in accordance with embodiments. System 600 may be a mobile device although system 600 is not limited to this context. For example, system 600 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 600 may also be an infrastructure device. For example, system 600 may be incorporated into a large format television, set-top box, desktop computer, or other home or commercial network device.

System 600 may implement all or a subset of the various methods described above in the context of FIGS. 3A, 4A, and 5. In various exemplary embodiments, processor 615 invokes or otherwise implements video/image enhancement operations including AWB. Processor 615 includes functionality to perform image chromaticity measurement methods upon which AWB processes may be predicated, for example as described elsewhere herein. For example, in one embodiment a processor 615 implements or includes an AWB module 617 to determine one or more raw image chromaticity weight $a_{(1)i}$, $a_{(2a)i}$, $a_{(2b)i}$, $a_{(3)i}$, or $a_{(4)i}$. In further embodiments, AWB module 617 is further to determine a white point based at least in part on image chromaticity weights $a_{(1)i}$, $a_{(2a)i}$, $a_{(2b)i}$, $a_{(3)i}$, $a_{(4)i}$. In one exemplary embodiment, processor 615 includes fixed-function and/or programmable logic circuitry to determine a white point based at least in part on image chromaticity weights $a_{(1)i}$, $a_{(2a)i}$, $a_{(2b)i}$, $a_{(3)i}$, $a_{(4)i}$ of from raw image data collected by camera module 610 and transmitted to processor 615 and/or image signal processor 614 over a bus. In some embodiments, one or more computer readable media may store instructions, which when executed by processor 615, cause the processor to perform one or more of the raw image chromaticity measurements described elsewhere herein. In alternative embodiments, ISP 614 includes firmware configured as an AWB module 616 that determines one or more raw image chromaticity weight $a_{(1)i}$, $a_{(2a)i}$, $a_{(2b)i}$, $a_{(3)i}$, or $a_{(4)i}$. In further embodiments, AWB module 616 is further to determine a white point based at least in part on image chromaticity weight $a_{(1)i}$, $a_{(2a)i}$, $a_{(2b)i}$, $a_{(3)i}$, $a_{(4)i}$. One or more white point or image chromaticity weights $a_{(1)i}$, $a_{(2a)i}$, $a_{(2b)i}$, $a_{(3)i}$, $a_{(4)i}$ may then be stored in memory 612.

In embodiments, system 600 includes a platform 602 coupled to a human interface device (HID) 620. Platform 602 may receive raw image data from camera module 610, which is then processed by ISP 614, and/or processor 615, and/or output to HID 620 and/or communicated via radio 618 to network 660. A navigation controller 1050 including one or more navigation features may be used to interact with, for example, platform 602 and/or HID 620. In embodiments, HID 620 may include any television type monitor or display. HID 620 may include, for example, a computer display screen, touch screen display, video monitor, television-like device, and/or a television.

Under the control of one or more software applications 616, platform 602 may display user interface 622 on HID 620. Movements of the navigation features of controller 650 may be replicated on a display (e.g., HID 620) by movements of a pointer, cursor, focus ring, or other visual indicators displayed on the display. For example, under the control of software applications 616, the navigation features located on navigation controller 650 may be mapped to virtual navigation features displayed on user interface 622, for example.

In embodiments, platform 602 may include any combination of a camera module 610, ISP 614, chipset 605, processor 615, memory 612, storage 611, applications 616, and/or radio 618. Chipset 605 may provide intercommunication among processor 610, memory 612, storage 611, graphics processor 615, applications 1016, or radio 1018.

Processor 615 may be implemented as one or more Complex Instruction Set Computer (CISC) or Reduced Instruction Set Computer (RISC) processors; x86 instruction set compatible processors, multi-core, or any other microprocessor or central processing unit (CPU). In embodiments, processor 615 may be a multi-core processor(s), multi-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 611 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device.

Processor 615 may perform processing of images such as still or video media data for display, or perform general computing functions. Processor 615 may include one or more CPU, GPU, or SoC, for example. An analog or digital interface may be used to communicatively couple processor 615 and display 620. For example, the interface may be any of a High-Definition Multimedia Interface, Display Port, wireless HDMI, and/or wireless HD compliant techniques. Processor 615 may be integrated with a graphics processor onto a single chip (i.e., SoC) as a graphics core or a graphics processor may be further provided as part of chipset 605.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The image data chromaticity measurements and AWB processes predicated on such measurements as described herein may be implemented in various hardware architectures, cell designs, or "IP cores."

Figure 7:
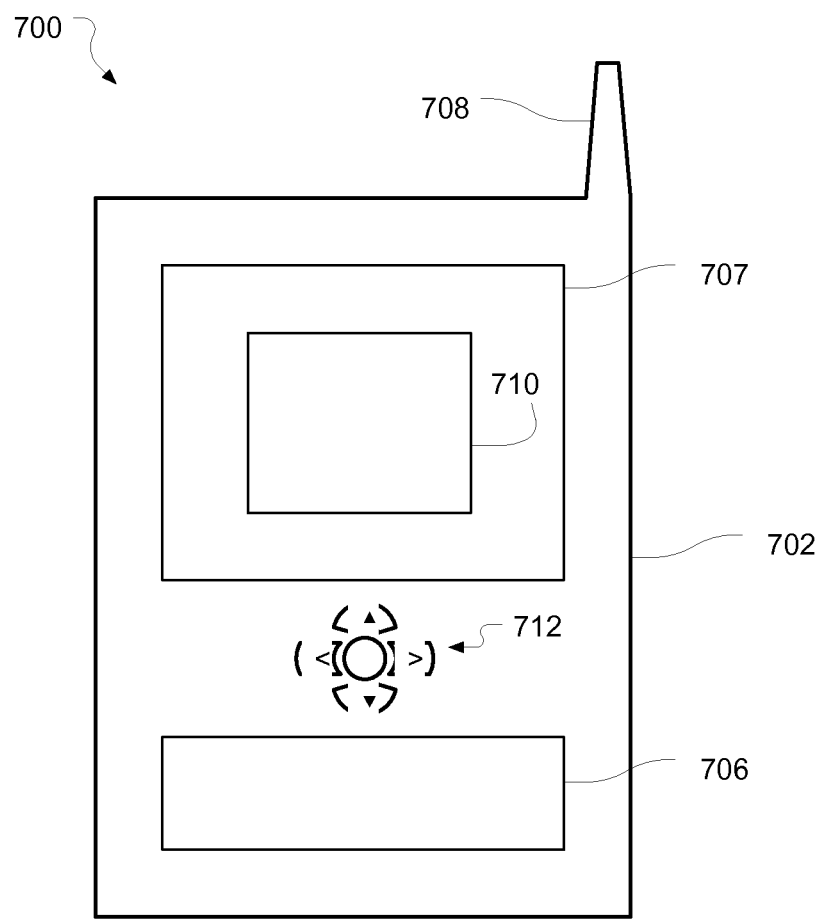
FIG. 7 is a diagram of an exemplary system, arranged in accordance with one or more embodiment.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown), or may be digitized by a voice recognition device. Embodiments are not limited in this context.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiment, a computer-implemented method for estimating a chromaticity value of raw image data includes receiving color channel values of a raw image data block, and normalizing the color channel values with a white point correction factor. The method further includes determining one or more first image chromaticity weight by quantifying a disparity among the normalized color channel values. The method further includes storing to a memory the one or more first image chromaticity weight in association with the raw image data block.

In furtherance of the one or more first embodiment, the method further includes determining a first white point estimate as a function of the one or more first image chromaticity weight, and storing the first white point estimate to a memory.

In furtherance of the one or more first embodiment, quantifying the disparity between color channel values further comprises determining a minimum color channel value and a maximum color channel value from the normalized raw image data block, and determining a ratio of the minimum and maximum color channel values.

In furtherance of the one or more first embodiment, quantifying the disparity between color channel values further comprises determining a mean color channel value from the normalized raw image data block, and determining from the mean color channel value a variation metric of the color channel values.

In furtherance of the one or more first embodiment, determining the one or more first image chromaticity weight further comprises determining first and second chromaticity weights as functions of the disparity between the color channel values.

In furtherance of the one or more first embodiment, determining the first and the second chromaticity weights further comprises determining a minimum color channel value and a maximum color channel value from the normalized raw image data block. The method further includes determining the first chromaticity weight based on a ratio of the minimum and maximum color channel values. The method further includes determining a mean color channel value from the normalized raw image data block. The method further includes determining from the mean color channel value a root mean square deviation of the color channel values. The method further includes determining the second chromaticity weight based on the root mean square deviation.

In furtherance of the one or more first embodiment, the method further includes determining the white point correction factor from sensor characterization data associated with an image sensor employed to collect image pixel data represented by the raw image data block.

In furtherance of the one or more first embodiment, the method further includes determining a preliminary estimate of the white point independently from the one or more image chromaticity weight, and determining the white point correction factor based on the preliminary estimate.

In furtherance of the one or more first embodiment, the method further includes determining one or more second image chromaticity weight based on a distance between a location of the raw image data in a sensor chromaticity space, and a nearest point within a locus of sensor illumination chromaticities. The method further includes determining the first white point estimate as a function of the one or more first chromaticity weight and of the one or more second chromaticity weight.

In furtherance of the embodiment immediately above, the method further includes determining the one or more second image chromaticity weight further comprises receiving sensor characterization data associated with an image sensor employed to collect image pixel data represented by the raw image data block. The method further includes determining the locus of sensor illumination chromaticities within the sensor chromaticity space based on the characterization data. The method further includes determining the distance, within the chromaticity space, between the raw image data and the nearest point in the locus of sensor illumination chromaticities. The method further includes determining the image chromaticity weight as a function of the determined distance.

In furtherance of the embodiment immediately above, receiving the raw image data further comprises receiving a plurality of image data blocks, each image data block including R, G, and B color channel values representative of a plurality of pixel color channel values. The one or more first image chromaticity weight and the one or more second image chromaticity weight are determined for each of the plurality of image data blocks. Determining the first white point estimate further comprises at least one of: determining the white point correction factor based on a preliminary estimate of the white point determined over the image data blocks; or combining the one or more first image chromaticity weight determined for each of the plurality of image data blocks with the one or more second image chromaticity weight determined for the corresponding raw data block. Determining the first white point estimate further comprises weighting the R, G, and B color channel values associated with each of the plurality of image data blocks with the one or more first image chromaticity weight, or with the combination thereof, and accumulating the weighted R,G,B color channel values over the plurality of data blocks.

In furtherance of the embodiment immediately above, the combination of the one or more first image chromaticity weight comprises a product of a first and a second chromaticity weight that is each a function of a disparity between the R, G, and B color channel values for each data block, and a third chromaticity weight that is based on a distance, within the chromaticity space, between the raw image data and the nearest point in the locus of sensor illumination chromaticities. The method further comprises determining a saturation value for each of the raw image data blocks, and determining the first white point estimate based only on the raw image data blocks associated with a saturation value below a predetermined maximum saturation threshold.

In furtherance of the embodiment immediately above, the method further includes determining a correlated color temperature (CCT) range based at least in part on sensor characterization data associated with an image sensor employed to collect image pixel data represented by the raw image data blocks. The method further includes identifying achromatic areas through a search of the plurality of raw data blocks having data values within the CCT range. The method further includes determining a second white point estimate based on the identified achromatic areas. The method further includes determining white balancing gains based on both the first white point estimate and the second white point estimate.

In one or more second embodiment, a processor includes an AWB module. The AWB module comprising logic circuitry to receive color channel values of a raw image data block. The module comprises logic circuitry to normalize the color channel values with a white point correction factor. The module comprises logic circuitry to determine one or more first image chromaticity weight by quantifying a disparity among the normalized color channel values. The module comprises logic circuitry to store to a memory the one or more first image chromaticity weight in association with the raw image data block.

In furtherance of the one or more second embodiment, the AWB module further comprises logic circuitry to quantify the disparity among the normalized color channel values by determining a minimum color channel value and a maximum color channel value from the normalized raw image data block, and determining a ratio of the minimum and maximum color channel values.

In furtherance of the one or more second embodiment, the AWB module further comprises logic circuitry to determine one or more second image chromaticity weight based on a distance between the raw image data in a sensor chromaticity space, and a nearest point within a locus of sensor illumination chromaticities. The AWB module further comprises logic circuitry to determine the first white point estimate as a function of the one or more first chromaticity weight and of the one or more second chromaticity weight.

In one or more fourth embodiment, a mobile device includes a camera module to generate raw image data. The device further includes a processor including an AWB module. The AWB module is coupled to the camera module to receive the raw image data. The AWB module is to generate raw image data blocks from the collected raw image data. The AWB module is to receive color channel values of a raw image data block. The AWB module is to normalize the color channel values with a white point correction factor. The AWB module is to determine one or more first image chromaticity weight by quantifying a disparity among the normalized color channel values. The mobile device further includes a memory to store the one or more first image chromaticity weight in association with the raw image data block.

In furtherance of the one or more fourth embodiment, the AWB module is further to determine one or more second image chromaticity weight based on a distance between the raw image data within a sensor chromaticity space, and a nearest point within a locus of sensor illumination chromaticities. The AWB module is further to determine the first white point estimate as a function of the one or more first chromaticity weight and of the one or more second chromaticity weight.

In one or more fifth embodiment, one or more computer-readable storage media has instructions stored thereon, which when executed by a processor, cause the processor to perform a method comprising receiving color channel values of a raw image data block, normalizing the color channel values with a white point correction factor, determining one or more first image chromaticity weight by quantifying a disparity among the normalized color channel values, and storing to a memory the one or more first image chromaticity weight in association with the raw image data block.

In furtherance of the one or more fifth embodiment, the media further includes instructions stored thereon, which when executed by the processor, further cause the processor to perform the method further comprising determining one or more second image chromaticity weight based on a distance between the raw image data in a sensor chromaticity space, and a nearest point within a locus of sensor illumination chromaticities, and determining the first white point estimate as a function of the one or more first chromaticity weight and of the one or more second chromaticity weight.

In one or more sixth embodiment, the AWB module comprising logic circuitry to perform any one of the method.

In one or more seventh embodiment, one or more computer-readable storage media has instructions stored thereon, which when executed by a processor, cause the processor to perform the method recited in any one of the one or more fifth embodiments.

In one or more eighth embodiment, a processor includes an AWB module. The AWB module includes a receiving means to receive color channel values of a raw image data block. The AWB module includes a normalization means coupled to the receiving means to normalize the color channel values with a white point correction factor. The AWB module include a color channel comparison means coupled to the normalization means to determine one or more first image chromaticity weight by quantifying a disparity among the normalized color channel values. The AWB module includes a storage means coupled to the comparison means to store the one or more first image chromaticity weight in association with the raw image data block.

In furtherance of the one or more eighth embodiment, the color channel comparison means further comprises a min/max identification means to determine a minimum color channel value and a maximum color channel value from the normalized raw image data block. The color channel comparison means further comprises a rationing means coupled to the min/max identification means, to determine a ratio of the minimum and maximum color channel values.

In furtherance of the one or more eighth embodiment, the AWB module further comprises a chromaticity distance determining means to determine one or more second image chromaticity weight based on a distance between the raw image data in a sensor chromaticity space, and a nearest point within a locus of sensor illumination chromaticities, and a white point estimation means coupled to the chromaticity distance determining means and to the color channel comparison means to determine the first white point estimate as a function of the one or more first chromaticity weight and of the one or more second chromaticity weight.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented method for estimating a chromaticity value of raw image data, comprising:
   receiving color channel values of a raw image data block;
   normalizing the color channel values with a white point correction factor;
   determining one or more first image chromaticity weights by quantifying a disparity among the normalized color channel values;
   determining a first white point estimate as a function of the one or more first image chromaticity weights; and
   storing the first white point estimate to a memory.

2. The method of claim 1, wherein quantifying the disparity between color channel values further comprises:
   determining a minimum color channel value and a maximum color channel value from the normalized raw image data block; and
   determining a ratio of the minimum and maximum color channel values.

3. The method of claim 1, wherein quantifying the disparity between color channel values further comprises:
   determining a mean color channel value from the normalized raw image data block; and
   determining from the mean color channel value a variation metric of the color channel values.

4. The method of claim 1, wherein determining the one or more first image chromaticity weight further comprises determining first and second chromaticity weights as functions of the disparity between the color channel values.

5. The method of claim 4, wherein determining the first and the second chromaticity weights further comprises:
- determining a minimum color channel value and a maximum color channel value from the normalized raw image data block;
- determining the first chromaticity weight based on a ratio of the minimum and maximum color channel values;
- determining a mean color channel value from the normalized raw image data block;
- determining from the mean color channel value a root mean square deviation of the color channel values; and
- determining the second chromaticity weight based on the root mean square deviation.

6. The method of claim 1, further comprising:
- determining the white point correction factor from sensor characterization data associated with an image sensor employed to collect image pixel data represented by the raw image data block.

7. The method of claim 1, further comprising:
- determining a preliminary white point estimate independently from the one or more image chromaticity weights; and
- determining the white point correction factor based on the preliminary white point estimate.

8. The method of claim 1, further comprising:
- determining one or more second image chromaticity weights based on a distance between a location of the raw image data in a sensor chromaticity space, and a nearest point within a locus of sensor illumination chromaticities; and
- determining the first white point estimate as a function of the one or more first chromaticity weights and of the one or more second chromaticity weights.

9. The method of claim 8, wherein determining the one or more second image chromaticity weights further comprises:
- receiving sensor characterization data associated with an image sensor employed to collect image pixel data represented by the raw image data block;
- determining the locus of sensor illumination chromaticities within the sensor chromaticity space based on the characterization data;
- determining the distance, within the chromaticity space, between the raw image data and the nearest point in the locus of sensor illumination chromaticities; and
- determining the image chromaticity weight as a function of the determined distance.

10. The method of claim 8, wherein:
- the raw image data further comprises receiving a plurality of image data blocks, each image data block including R, G, and B color channel values representative of a plurality of pixel color channel values;
- the one or more first image chromaticity weights and the one or more second image chromaticity weights are determined for each of the plurality of image data blocks;
- determining the first white point estimate further comprises at least one of:
  - determining the white point correction factor based on a preliminary estimate of the white point determined over the image data blocks; or
  - combining the one or more first image chromaticity weights determined for each of the plurality of image data blocks with the one or more second image chromaticity weights determined for the corresponding raw data block; and
- determining the first white point estimate further comprises:
  - weighting the R, G, and B color channel values associated with each of the plurality of image data blocks with the one or more first image chromaticity weight, or with the combination thereof; and
  - accumulating the weighted R,G,B color channel values over the plurality of data blocks.

11. The method of claim 10, wherein:
the combination of the one or more first image chromaticity weight comprises a product of:
- a first and a second chromaticity weight that are each a function of a disparity between the R, G, and B color channel values for each data block; and
- a third chromaticity weight that is based on a distance, within the chromaticity space, between the raw image data and the nearest point in the locus of sensor illumination chromaticities; and the method further comprises:
- determining a saturation value for each of the raw image data blocks; and
- determining the first white point estimate based only on the raw image data blocks associated with a saturation value below a predetermined maximum saturation threshold.

12. The method of claim 10, further comprising:
- determining a correlated color temperature (CCT) range based at least in part on sensor characterization data associated with an image sensor employed to collect image pixel data represented by the raw image data blocks;
- identifying achromatic areas through a search of the plurality of raw data blocks having data values within the CCT range;
- determining a second white point estimate based on the identified achromatic areas; and
- determining white balancing gains based on both the first white point estimate and the second white point estimate.

13. A processor comprising an AWB module, the AWB module comprising logic circuitry to:
- receive color channel values of a raw image data block;
- normalize the color channel values with a white point correction factor;
- determine one or more first image chromaticity weights by quantifying a disparity among the normalized color channel values;
- determine a first white point estimate as a function of the one or more first image chromaticity weights; and
- store the first white point estimate to a memory.

14. The processor of claim 13, wherein the AWB module further comprises logic circuitry to quantify the disparity among the normalized color channel values by:
- determining a minimum color channel value and a maximum color channel value from the normalized raw image data block; and
- determining a ratio of the minimum and maximum color channel values.

15. The processor of claim 13, wherein the AWB module further comprises logic circuitry to:
- determine one or more second image chromaticity weights based on a distance between the raw image data in a sensor chromaticity space, and a nearest point within a locus of sensor illumination chromaticities; and
- determine the first white point estimate as a function of the one or more first chromaticity weights and of the one or more second chromaticity weights.

16. A mobile device, comprising:
a camera module to generate raw image data;
a processor coupled to the camera module to receive the raw image data, and further to:
generate raw image data blocks from the collected raw image data;
receive color channel values of a raw image data block;
normalize the color channel values with a white point correction factor; and
determine one or more first image chromaticity weights by quantifying a disparity among the normalized color channel values;
determine a first white point estimate as a function of the one or more first image chromaticity weights; and
a memory to store the first white point estimate.

17. The mobile device of claim 16, wherein the AWB module is further to:
determine one or more second image chromaticity weights based on a distance between the raw image data within a sensor chromaticity space, and a nearest point within a locus of sensor illumination chromaticities; and
determine the first white point estimate as a function of the one or more first chromaticity weights and of the one or more second chromaticity weight.

18. One or more non-transitory computer-readable storage media, with instructions stored thereon, which when executed by a processor, cause the processor to perform a method comprising:
receiving color channel values of a raw image data block;
normalizing the color channel values with a white point correction factor;
determining one or more first image chromaticity weights by quantifying a disparity among the normalized color channel values;
determining a first white point estimate as a function of the one or more first image chromaticity weights; and
storing the first white point estimate to a memory.

19. The media of claim 18, further comprising instructions stored thereon, which when executed by the processor, further cause the processor to perform the method further comprising:
determining one or more second image chromaticity weights based on a distance between the raw image data in a sensor chromaticity space, and a nearest point within a locus of sensor illumination chromaticities; and
determining the first white point estimate as a function of the one or more first chromaticity weights and of the one or more second chromaticity weights.

20. The media of claim 18, further comprising instructions stored thereon, which when executed by the processor, further cause the processor to perform the method further comprising:
determining a minimum color channel value and a maximum color channel value from the normalized raw image data block; and
determining a ratio of the minimum and maximum color channel values.

21. The media of claim 18, further comprising instructions stored thereon, which when executed by the processor, further cause the processor to perform the method further comprising:
determining a mean color channel value from the normalized raw image data block; and
determining from the mean color channel value a variation metric of the color channel values.

22. The media of claim 18, wherein determining the one or more first image chromaticity weights further comprises determining first and second chromaticity weights as functions of the disparity between the color channel values.

23. The media of claim 18, wherein determining the first and the second chromaticity weights further comprises:
determining a minimum color channel value and a maximum color channel value from the normalized raw image data block;
determining the first chromaticity weight based on a ratio of the minimum and maximum color channel values;
determining a mean color channel value from the normalized raw image data block;
determining from the mean color channel value a root mean square deviation of the color channel values; and
determining the second chromaticity weight based on the root mean square deviation.

* * * * *